United States Patent
Wynn et al.

(10) Patent No.: US 6,515,687 B1
(45) Date of Patent: Feb. 4, 2003

(54) VIRTUAL JOYSTICK GRAPHICAL USER INTERFACE CONTROL WITH ONE AND TWO DIMENSIONAL OPERATION

(75) Inventors: Allen C. Wynn, Round Rock, TX (US); Cristi N. Ullmann, Austin, TX (US); Michael W. Brown, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,749

(22) Filed: May 25, 2000

(51) Int. Cl.[7] .................................................. G06F 3/00
(52) U.S. Cl. ......................................... 345/840; 345/157
(58) Field of Search ................................. 345/726, 762, 345/763, 825, 826, 721, 722, 723, 656, 840, 841, 156, 152, 158

(56) References Cited

U.S. PATENT DOCUMENTS 5,777,616 A * 7/1998 Bates et al. ................. 345/764
5,844,560 A 12/1998 Crutcher
6,414,696 B1 * 7/2002 Ellenby et al. ............. 345/762

* cited by examiner

*Primary Examiner*—Cao H. Nguyen
(74) *Attorney, Agent, or Firm*—Robert H. Frantz; David A. Mims, Jr.

(57) ABSTRACT

A virtual joystick GUI control with self-centering capability which provides a computer system user the ability to scroll at an angle using an n-dimensional graphical control interface. The virtual joystick may be displayed in simple two-dimensional view for control of one dimension of scrolling, such as left/right or up/down. Alternatively, the virtual joystick may be displayed in a simulated three-dimensional (perspective) view which allows scrolling in two dimensions, such as up/down/left/right and combinations thereof. The new virtual joystick can be used to scroll displays, or control other system functions and program parameters, such as volume up/down and tone bass/treble. In general, the virtual joystick can allow control of one or two variables over a range of values.

12 Claims, 6 Drawing Sheets

VIRTUAL JOYSTICK GRAPHICAL USER INTERFACE CONTROL WITH ONE AND TWO DIMENSIONAL OPERATION

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE INVENTION

1. Field of the Invention

This invention relates to the arts of graphical user interface controls provided on computer displays, and to related displays such as personal digital assistants ("PDA") and wireless communications devices.

2. Description of the Related Art

Graphical user displays on electronic devices such as computers, personal digital assistants, and wireless communications devices are common in the art. As these devices become more and more integral to activities in the daily lives of people such as web browsing, word processing, and even making telephone calls, the efficiency and ergonomics of these interfaces are extremely important. A user will quickly notice whether one user interface is easier and quicker to use than another based upon the number of operations required to perform a certain task. Further, the level of "intuitiveness" implemented in the user interface can greatly increase the usefulness and speed with which the user can operate the device.

Many graphical user interfaces follow the same conventions for navigation of and selection of controls on the user interface. Such common graphical user interfaces ("GUI") include windows or frames-type displays in Microsoft's Windows operating system, Unix operating system, IBM's OS/2 and AIX operating systems, Microsoft's Windows CE operating system, Apple Computer's operating system, and many "proprietary" windows-like GUI's on various devices such as PDA's, cell phones, electronic organizers, etc.

Figure 1:
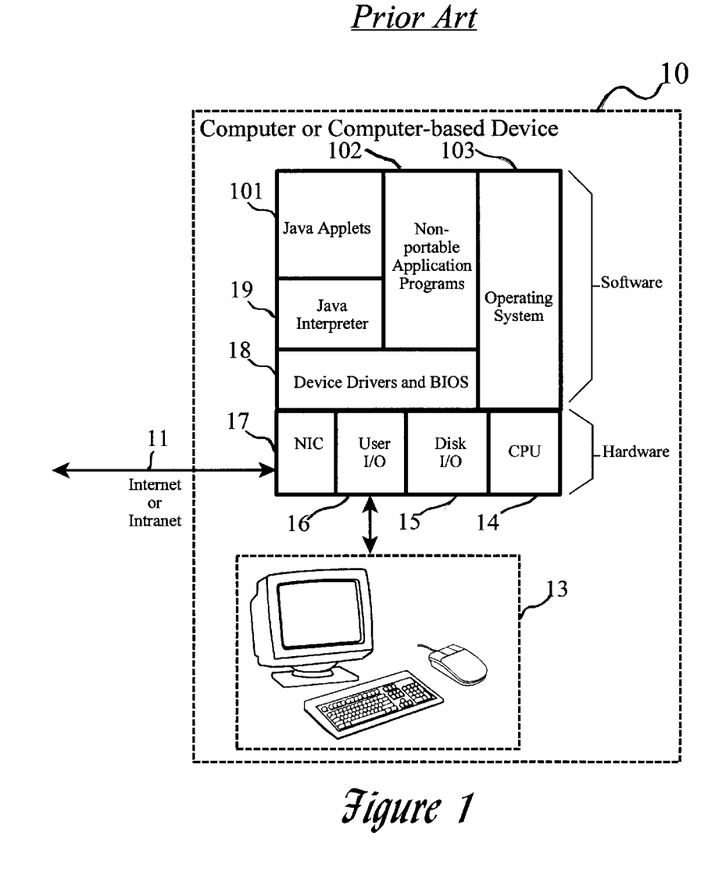
FIG. 1 shows the prior art arrangement of computers and computer-based devices with graphical user interfaces.

FIG. 1 shows the basic organization of many prior art computer systems and computer-based devices. The system (10) typically includes a microprocessor or central processor unit ("CPU") including computer memory, and may also include interfaces to hard disks and removable disk media (14), and possibly interfaces to computer or communications networks (17) such as a network interface card ("NIC") or wireless communications interface. Commonly used NICs include EtherNet local area network ("LAN") cards, dial-up modem cards, and wireless communications circuits. Some of these circuits may be provided integral to the device (10), such as the case with web-enabled cell phones, or may be available as add-in circuits such as PCI cards or PCMCIA cards for personal computers.

Additional typical hardware provided in the system (10) includes a group of user input/output ("I/O") devices (13), such as a display, keyboard, and/or pointing device, accompanied by common user I/O interface circuits to allow the CPU and system software to access and use the user I/O devices (13). Common display devices include VGA and LCD monitors for personal computers, and LCD panels for PDA and cell phones. Common pointing devices include "arrow keys", "tab" keys, mouse and scroll-mouse, joystick, track balls, glide point touch sensitive pads, and touch sensitive displays with stylus pens. Some devices, such as certain PDA's, do not include an actual keyboard, but rather rely upon a touch-sensitive LCD display with virtual pointing device and stylus.

The software functionality of computer-based systems (10) can be divided into low-level device drivers and BIOS (18), an operating system (103), and applications programs. Low-level device drivers provide hardware-specific interface functions which allow the operating system and application programs to access the system hardware through common or generic application program interfaces ("API"). Some device drivers include necessary communications protocols and methods associated with a particular hardware device, such as a modem or wireless communications interface. Application programs can be further divided into portable applications, or applets (101), and non-portable, system-dependent applications (102). Such division of hardware and software functionality is well-understood in the art, and can be applied to large computer systems such as an IBM AS/400 equally as well to small computer systems such as PDA's running Windows CE.

Figure 2:
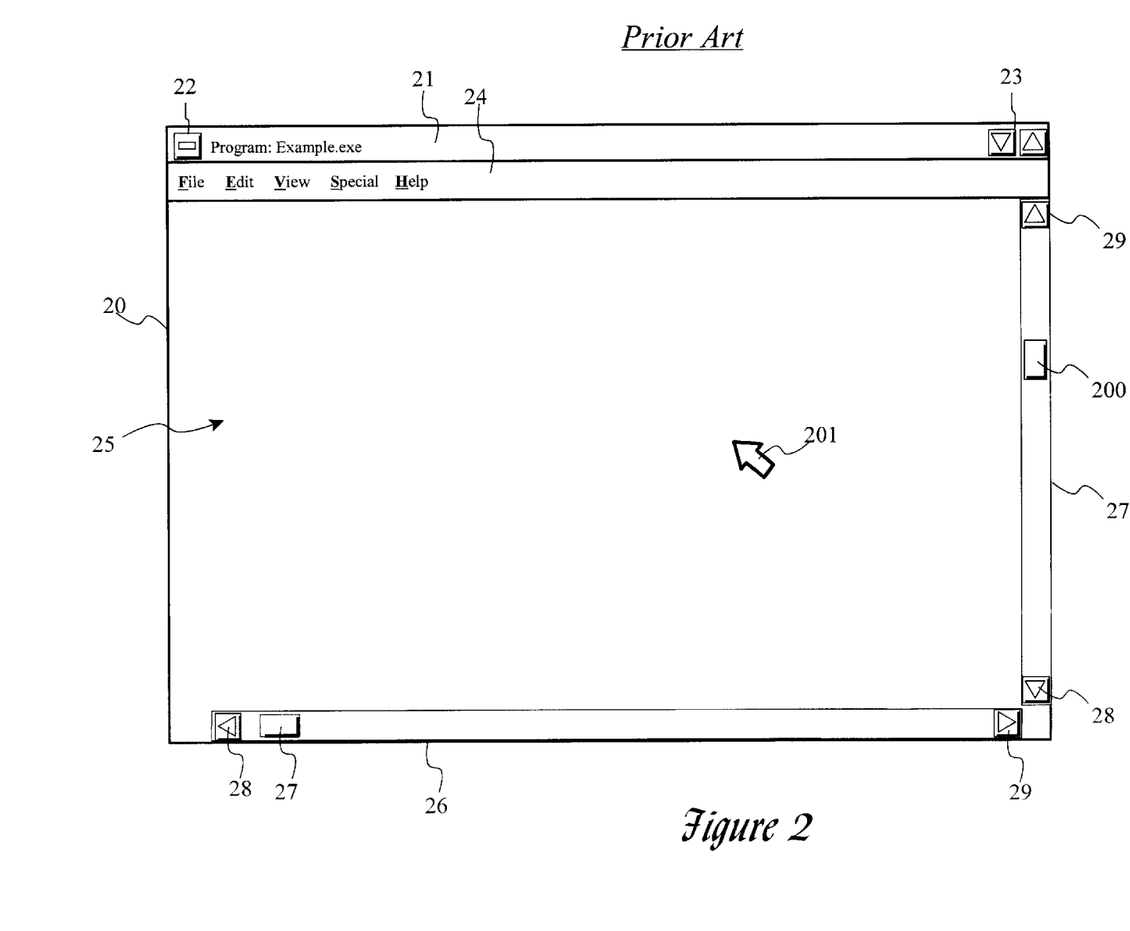
FIG. 2 presents an example GUI frame.

On the system display is typically shown a conventional frame or "window" of information related to a specific system function or program, such as a word processor, spreadsheet, to-do list, address book, e-mail client, or web browser. FIG. 2 shows a typical arrangement of a frame (20) including a title bar (21), tool bar (24), display area (25), and a pointer (201). The pointer (201) moves in response to the system pointing device and/or keyboard, such as typing on the arrow keys, movement of a mouse, track ball, or joystick. The title bar may include "buttons" for minimizing or restoring the frame (23), closing the program (22), as well as a display of the name of the function or program. The tool bar (24) typically includes a number of text and/or iconic options, such as "file" and "edit" drop-down lists.

The display area may be further navigable using vertical scroll (27) and horizontal scroll (26) bars, which are especially useful for system displays of information which cannot be shown completely within one frame on the display. "Clicking" on the right button (29) or left button (28), or "dragging" the horizontal position indicator (27) causes the information in the display area (25) to be panned or scrolled left or right. Likewise, using the up button (29), down button (28), or vertical position indicator (200) can cause panning or scrolling in a vertical motion. These types of scroll bars are common on word processors, spreadsheets, graphical design packages, and web browsers.

In typical operation of these types of GUI displays, the user moves the pointer (201) to a button or text option, and selects that option by clicking on it and/or dragging it. In some cases, keyboard-only navigation or selection is possible by using special combinations of keys, such as ALT-F to select the "file" drop-down menu.

The article "Multistream input: An experimental study of document scrolling methods" in the IBM Systems Journal Vol. 38, No. 4, 1999, "investigates alternative methods to improve user performance for browsing World Wide Web and other documents." This investigation involved a task requiring both scrolling and pointing, and compared the following input devices: (a) standard mouse, (b) wheel mouse, (c) joystick mouse (combination Standard Mouse with a joystick), and (d) trackpoint (such as found on an IBM ThinkPad computer) with supplemental Standard Mouse.

The results of the experimental study showed that a mouse with a finger wheel did not improve a user's performance or subjective rating over a standard mouse. Indeed, the participants commented that it was tedious and tiring to repeatedly roll the wheel, although this mode was intuitive. The researchers believed that the lack of "self-centering" placed the wheel mouse at a fundamental disadvantage to do effective rate control. The results also indicated that the Joystick Mouse and the Trackpoint with supplemental Standard Mouse performed better than the Standard Mouse alone, both in terms of performance and user perception. "Self-centering" is a very useful attribute of an input device when scrolling through documents, maps, etc. In addition, there are some instances where the user may wish to scroll in a direction other than directly up, down, left or right. For example, a user may want to scroll a map at an angle towards a destination city.

Therefor, there is a need in the art for a virtual control device, such as a GUI control element, which allows any user to scroll at combinations of two dimensions, such as horizontal and vertical, using only a common mouse on a computer or computer-based device. Further, there are needs in the art for this GUI control to utilize display space efficiently, to be universally recognizable for its function and use by a wide variety of users, and to have self-centering capabilities.

BRIEF DESCRIPTION OF THE DRAWINGS

The following detailed description when taken in conjunction with the figures presented herein present a complete description of the present invention.

SUMMARY OF THE INVENTION

The invention provides a GUI control with self-centering capability as well as the ability to scroll at an angle using an n-dimensional graphical control interface through a joystick-like icon. The virtual joystick may be displayed in simple two-dimensional view for control of one dimension of scrolling, such as left/right or up/down. Alternatively, the virtual joystick may be displayed in a simulated three-dimensional (perspective) view which allows scrolling in two dimensions, such as up/down/left/right and combinations thereof. The new virtual joystick can be used to scroll displays, or control other system functions and program parameters, such as volume up/down and tone bass/treble. In general, the virtual joystick can allow control of one or two variables over a range of values.

DETAILED DESCRIPTION OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention is preferably realized as a user graphical interface control or dialog object integrated into a function or application program on a computer or computer-based system. The computer-based system is preferably provided with an operating system which provides common GUI control functions, such as pointer location and movement detection, event handling based upon areas on the display in which the pointer is located, and event handling of pointer selection such as mouse clicks. As such, the invention can be realized on personal computers, palm-top computers and personal digital assistants, as well as other devices incorporating graphical user displays such as cell phones and wireless web browsers.

Virtual Joystick User Operation

Figure 3A:
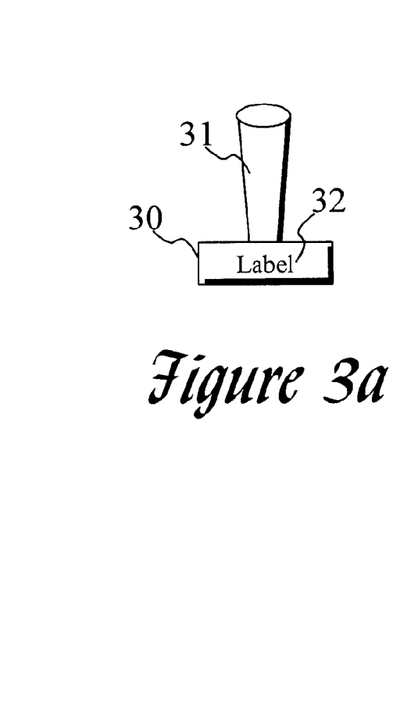
FIGS. 3a through 3c illustrates a one-variable controller.
Figure 3B:
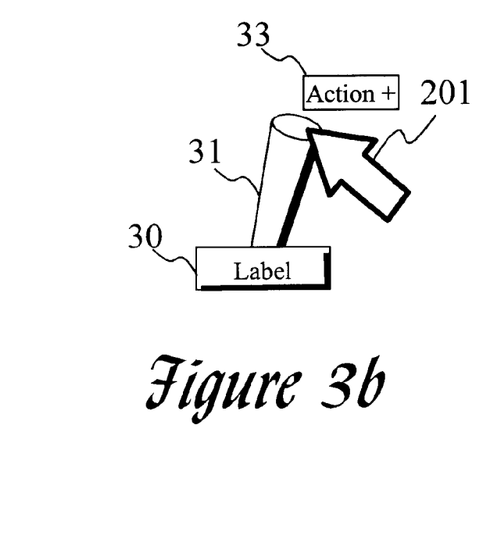
Figure 3C:
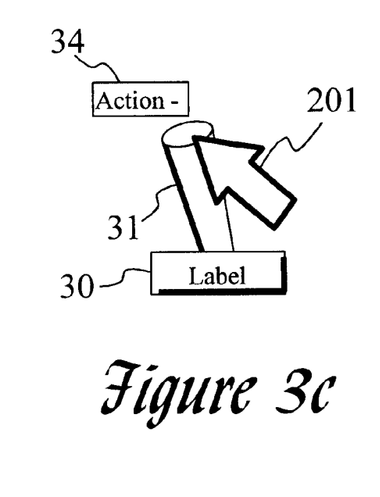

The new virtual joystick control may be displayed on the computer or computer-based device in a flat, two-dimensional view for control of one dimension of scrolling, such as left/right or up/down, as shown in FIG. 3a. In this one-dimensional joystick control realization, the control icon (30) preferably consists of a body (30) on which a label (32) is displayed to indicate the topic or system function which is controlled by the control icon (30). Example labels might be "PAN L/R" or "VOL". The icon also includes the stick (31), which can be selected by the user using actions such as moving the pointer (201) over the stick (31), selecting it and moving it left or right. A conventional way of moving the stick (31) would involved clicking on the stick with the mouse, and holding the mouse button while moving the stick left or right, as shown in FIG. 3b and FIG. 3c. In the preferred embodiment, a small prompt box (33 and 34) may be displayed when the stick (31) is moved from it's normal position, in which information about the action being performed may be displayed. For example, if the topic of the control is "speaker volume", the label (32) may be set to "VOL", and moving the stick to the right may display (34) "VOL UP", and to the left may display (33) "VOL DOWN".

Figure 6:
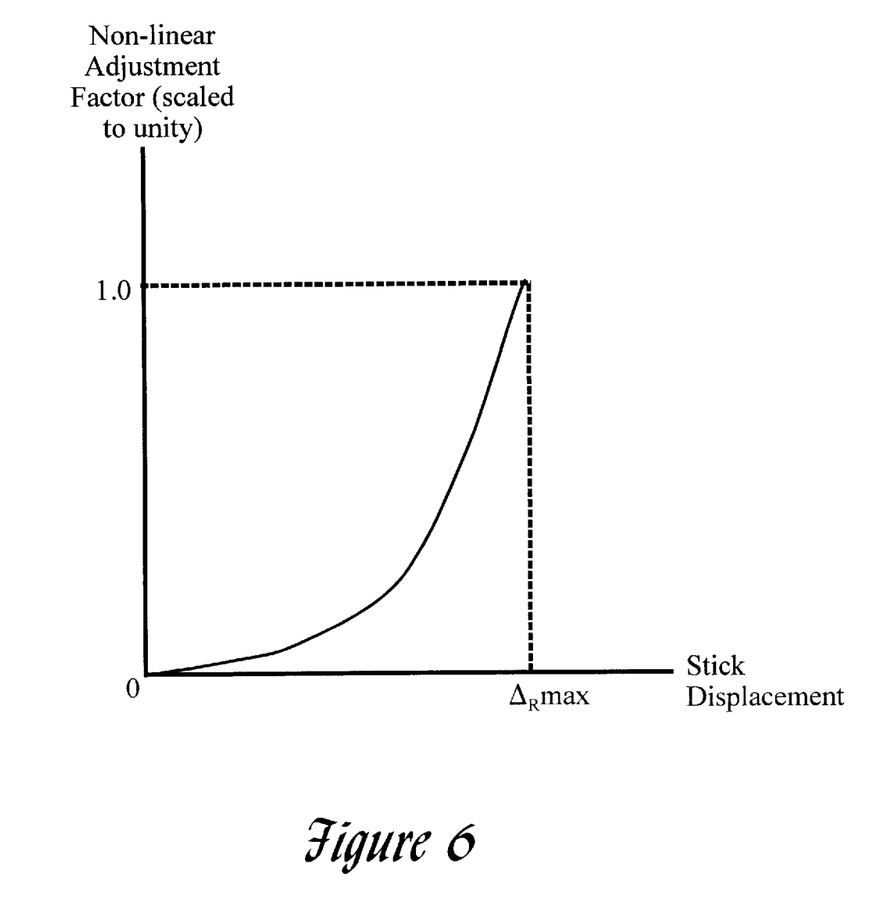
FIG. 6 shows an sample non-linear function for use in determining the non-linear response to the position of the joystick.

Depending on the type of parameter being controlled, each "toggle" of the stick may cause an step increment or decrement in the parameter, or holding the stick left or right may cause continuous incrementing and decrementing of the parameter. Further, in the preferred embodiment, the response to the movement of the stick related to the change in the controlled parameter may be a non-linear relationship, such as shown by the graph in FIG. 6. This would allow for faster and slower panning, volume changing, etc., based upon the amount of displacement of the stick from the normal, center position.

Figure 4A:
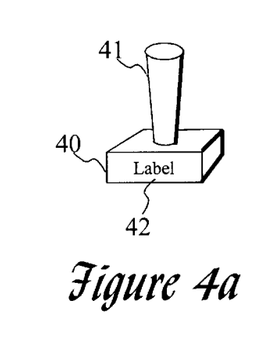
FIGS. 4a through 4f show a realization of the virtual joystick for control of two variables or system parameters.
Figure 4B:
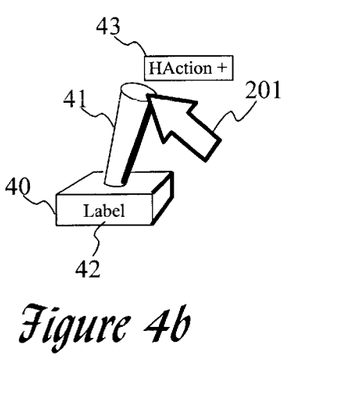
Figure 4C:
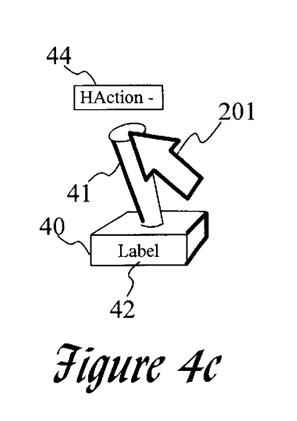
Figure 4D:
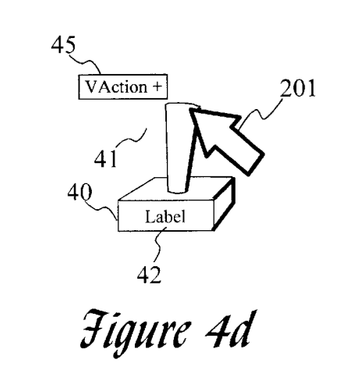
Figure 4E:
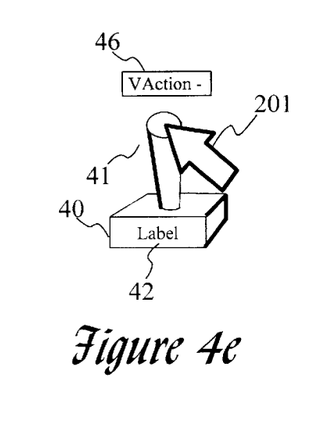

Alternatively, the virtual joystick may be displayed in a simulated three-dimensional, perspective view, as shown in FIG. 4a. This type of virtual joystick allows scrolling (or other parameter variation) in two dimensions, such as up/down/left/right and combinations thereof. This realization also includes a body (40), topic label (42), and stick. The stick is preferably highlighted as shown to produce a shadow-type effect, depending on the virtual angle of tilt of the stick. In FIG. 4b, the user has selected and moved the stick to the right, such as moving the pointer over the stick, clicking and holding a mouse button while moving the mouse slightly to the right. In the preferred embodiment, a small information box (43) is displayed which indicates the parameter being changed and the nature of the change. FIG. 4c shows movement to the left of the joystick. However, by selecting the joystick and moving it back or forward (up or down movement with the mouse), the second variable may be controlled, as shown and displayed in FIGS. 4d and 4e.

Figure 4F:
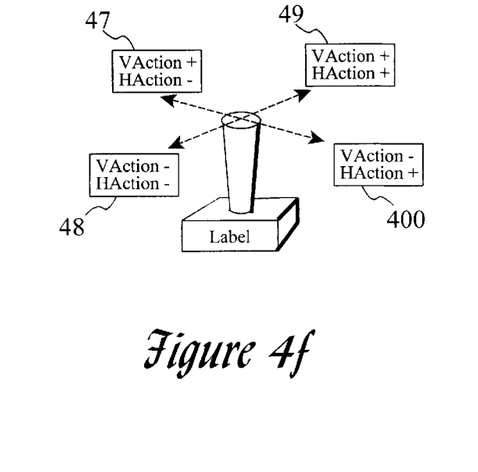

Further, the two parameters may be controlled and changed simultaneously by "diagonal" moves of the stick, as shown by the dotted lines in FIG. 4f, and the information box may indicate two parameters are being changed simultaneously (47, 48, 49, and 400). By moving the joystick in any of the directions from center point or normal position, the user can then select any combination of the two parameter values. For example, if the virtual joystick is used to control panning of a display, the label may display "PAN", and movement of the joystick may cause up, down, left, right, and diagonal movements of the displayed frame.

Figure 5:
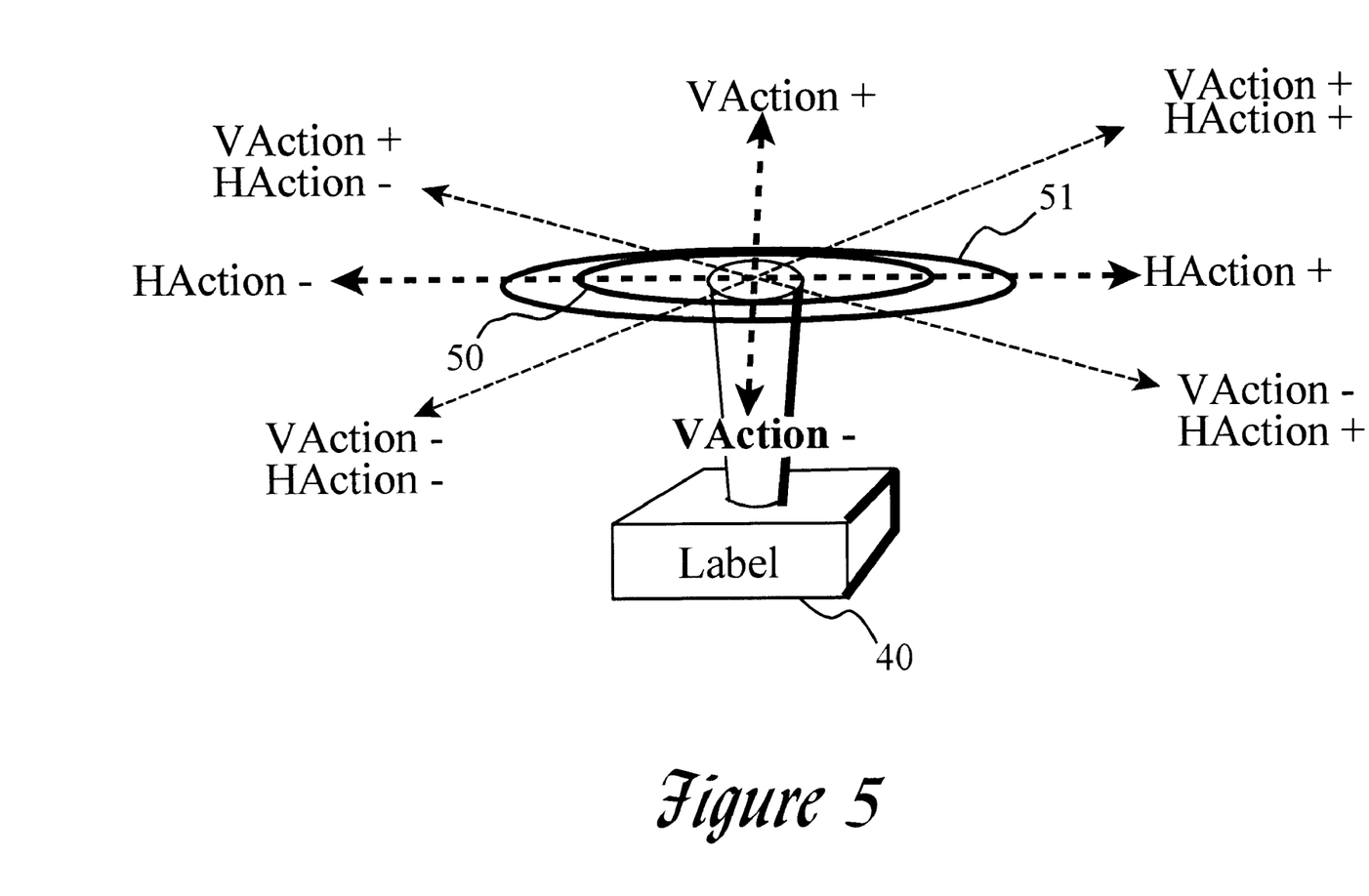
FIG. 5 further illustrates the concept of non-linear response based upon joystick displacement from the center position.

In an enhanced realization of the two-variable control, the distance the joystick is moved from normal, centered position can non-linearly effect the value or rate of change of value of a system function or program parameter. FIG. 5 shows two ellipses (50 and 51) which illustrates two levels of displacement of the stick in a perspective view. The same non-linear function described previously may be applied to the changing of the individual two parameters being controlled.

Logical Processing for the Virtual Joystick

TABLE 1 shows pseudo-code for a preferred embodiment of a two-variable controlling virtual joystick, and TABLE 2 shows pseudo-code for a preferred embodiment of a one-variable controlling virtual joystick. The designs may be realized using any suitable programming language, such as C++ or Java, compatible with the intended target computer or computer-based device platform.

TABLE 1

Two-Variable Control Joystick

```
If pointer is near joystick icon {center pointer over stick}
While (pointer selects stick) {
    determine mouse horizontal position from center point (delta-H)
    apply horizontal relationship table to delta-H
    update (H_action_parameter)
    determine mouse vertical position from center point
    apply vertical relationship table to delta-V
    update (V_action_parameter)
    determine displacement of stick from center position (delta-R)
    update stick position display
    If nonlinear_rate = enabled {
        apply delta-R to standard update time} /endif
    wait (standard update time)
}/end while
```

As shown in TABLE 1, if the control implementation includes optional self-centering functionality, the pointer position is monitored for positioning within an area nearby the control icon. When it is detected to be in the vicinity of the icon, the pointer control software is executed and the pointer is initially forced or moved to be over the stick. For the two-dimensional control, each of the two parameters are then processed independently by resolving the pointer position into two components, optionally applying a non-linear function such as a table of values scaled to unity, and updating each of the system parameters. The net displacement (or vector magnitude) of the joystick is next determined so that an appropriate image bitmap of the stick can be retrieved and displayed to show the new position of the stick. This displacement may be calculated as simply as determining using the radius equation:

$$\text{delta-}R = \text{SQRT}(\text{delta-}H^{}2 + \text{delta-}V^{}2)$$

where SQRT is a square-root finding function and **2 represents a squaring function.

Optionally, if this control includes non-linear response to the rate of change of the controlled variables, the displacement can be used to modify the time waited between stick position measuring and parameter updating, thereby increasing or decreasing the rate of change depending on the distance the stick is moved from normal.

One variable control using the joystick is basically a subset of the functional processing for a two-variable control, as shown in TABLE 2.

TABLE 2

One-Variable Control Joystick

```
If pointer is near joystick icon {center pointer over stick}
While (pointer selects stick) {
    determine mouse horizontal position from center point (delta-H)
    apply horizontal relationship table to delta-H
    update (H_action_parameter)
    delta-R = delta-H
    update stick position display
    If nonlinear_rate = enabled {
        apply delta-R to standard update time} /endif
    wait (standard update time)
}/end while
```

Summary

The virtual joystick GUI control element as disclosed provides enhanced control of GUI-based computer applications. One primary advantage is that it reduces the real-estate requirements for the mouse giving the user functionality closer to that of a trackball or joystick. Another advantage is that it allows combination or vectored control of two variables simultaneously, which is especially useful for panning control. The variable rate of change feature of the invention further enhances the efficiency with which a user can operate the control.

It will be understood from the foregoing description that various modifications and changes may be made in the preferred embodiment of the present invention without departing from its true spirit, such as the use of alternate programming methodologies or languages, alternate computer platforms and software, operating systems and user control objects. It is intended that this description is for purposes of illustration only and should not be construed in a limiting sense. The scope of this invention should be limited only by the language of the following claims.

What is claimed is:

1. A method for interfacing with a user of a computer system having a graphical user display, the method comprising the steps of:

(a) controlling a pointer element on the graphical user display with a user pointer controller, the pointer controller having position and selection status responsive to operation by a user;

(b) displaying on said graphical user display a joystick icon having and action area indicated by a stick portion of the icon, and having a topic label area;

(c) monitoring said position and selection status of said pointer controller relative to said stick portion of the icon to determine if the stick has been selected and dragged by said user;

(d) altering the appearance of said joystick icon to visually indicate the selection of said stick portion of the joystick icon such that said stick portion appears to move in a direction corresponding to dragging action of the pointer controller; and (e) generating a signal to said computer system indicative of change to a system parameter made by said user responsive to the operation of the joystick icon such that the user may operate vary at least one system parameter value using said joystick icon on said graphical user display.

2. The method of claim 1 further comprising the step of displaying a pop-up information prompt in the proximity of joystick icon while the icon is selected by the user such that the user is informed of the system parameter changes being made.

3. The method of claim 1 wherein said step of monitoring said position and selection status of said pointer controller relative to said stick portion of the icon further comprises resolving the position of the pointer relative to the normal position of the stick portion of the joystick icon into two or more scalar components, each scalar component being used to control and modify a system parameter.

4. The method of claim 1 wherein said step of monitoring said position and selection status of said pointer controller relative to said stick portion of the icon further comprises applying a non-linear multiplier value to at least one system parameter under control of the joystick icon such that response of the joystick icon is non-linearly related to change in the system parameter under control of the joystick.

5. A computer-readable storage medium having stored therein computer-readable program code for interfacing with a user of a computer system, the computer system having a graphical user display and a processor, wherein the program code when executed by the processor causes the processor to perform the steps of:

(a) controlling a pointer element on the graphical user display with a user pointer controller, the pointer controller having position and selection status responsive to operation by a user;

(b) displaying on said graphical user display a joystick icon having and action area indicated by a stick portion of the icon, and having a topic label area;

(c) monitoring said position and selection status of said pointer controller relative to said stick portion of the icon to determine if the stick has been selected and dragged by said user;

(d) altering the appearance of said joystick icon to visually indicate the selection of said stick portion of the joystick icon such that said stick portion appears to move in a direction corresponding to dragging action of the pointer controller; and (e) generating a signal to said computer system indicative of change to a system parameter made by said user responsive to the operation of the joystick icon such that the user may operate vary at least one system parameter value using said joystick icon on said graphical user display.

6. The computer-readable storage medium of claim 5 wherein said program code further comprises program code when executed by the processor to perform the step of displaying a pop-up information prompt in the proximity of joystick icon while the icon is selected by the user such that the user is informed of the system parameter changes being made.

7. The computer-readable storage medium of claim 5 wherein said program code further comprises program code when executed by the processor to perform the step of monitoring said position and selection status of said pointer controller relative to said stick portion of the icon further comprises resolving the position of the pointer relative to the normal position of the stick portion of the joystick icon into two or more scalar components, each scalar component being used to control and modify a system parameter.

8. The computer-readable storage medium of claim 5 wherein said program code to perform the step of monitoring said position and selection status of said pointer controller relative to said stick portion of the icon further comprises program code for applying a non-linear multiplier value to at least one system parameter under control of the joystick icon such that response of the joystick icon is non-linearly related to change in the system parameter under control of the joystick.

9. A computer system for interfacing with a user, comprising:

(a) a graphical user display with a virtual joystick control displayed on said graphical user display, said virtual joystick having a stick display portion and a topic label area;

(b) a pointer controller operable by said user for positioning a pointer element on the graphical user display, the pointer controller having position and selection status responsive to operation by a user;

(c) a pointer position and selection status monitor for detecting when the stick portion of the virtual joystick has been selected by said user; and (d) a virtual joystick controller which alters the appearance of said virtual joystick display to visually indicate to visually indicate the selection of said stick portion of the joystick icon such that said stick portion appears to move in a direction corresponding to dragging action of the pointer controller; and (e) a signal generator for signaling said computer system in response to movement of the virtual joystick control made by said user such that at least one system parameter may be varied.

10. The computer system of claim 9 further comprising a pop-up information prompt displayed on the graphical user display in the proximity of joystick icon while the icon is selected by the user such that the user is informed of the system parameter changes being made.

11. The computer system of claim 9 wherein said virtual joystick controller further comprises a pointer position resolver for resolving the position of the pointer relative to the normal position of the stick portion of the joystick icon into two or more scalar components, each scalar component being used to control and modify a system parameter.

12. The computer system of claim 9 wherein said virtual joystick controller further comprises a non-linear multiplier which modifies at least one system parameter under control of the joystick icon such that response of the joystick icon is non-linearly related to change in the system parameter under control of the joystick.

* * * * *